July 17, 1934.  C. W. FREDERICK  1,966,792
CATADIOPTRIC UNIT
Filed Oct. 26, 1932  2 Sheets-Sheet 1
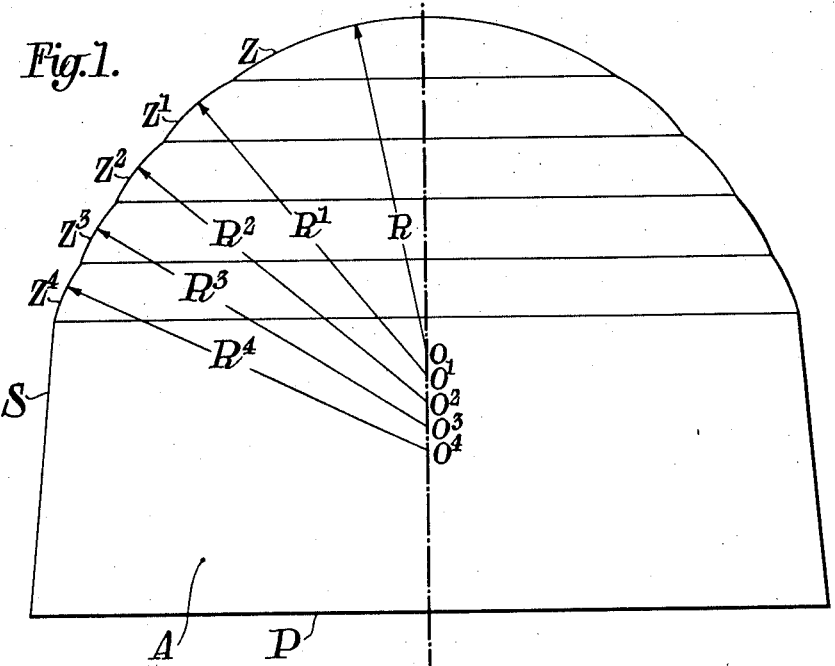
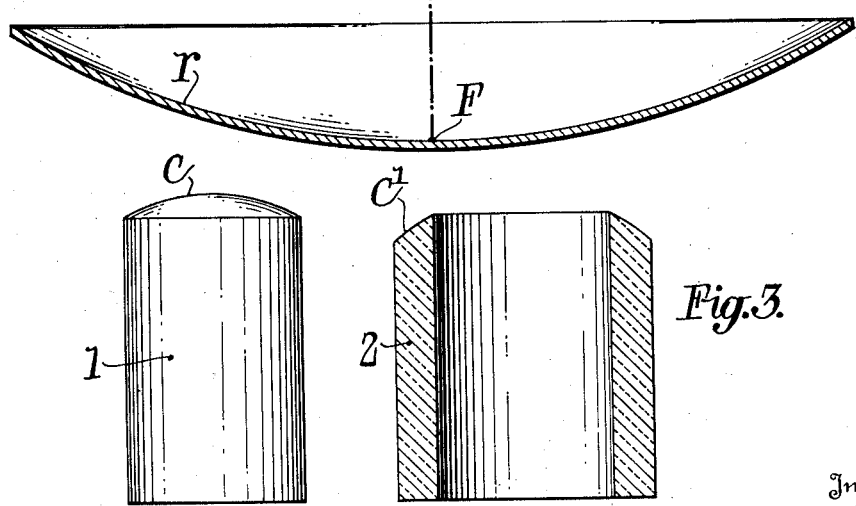
Inventor:
Charles W. Frederick,
By Newton N. Perriss
Attorney.

July 17, 1934.   C. W. FREDERICK   1,966,792
CATADIOPTRIC UNIT
Filed Oct. 26, 1932   2 Sheets-Sheet 2

Inventor:
Charles W. Frederick,
By Newton M. Perrin
Attorney.

Patented July 17, 1934

1,966,792

UNITED STATES PATENT OFFICE 1,966,792

CATADIOPTRIC UNIT

Charles W. Frederick, Rochester, N. Y., assignor to Eastman Kodak Company, Rochester, N. Y., a corporation of New York Application October 26, 1932, Serial No. 639,575

5 Claims. (Cl. 88—1)

This invention relates to lenses for catadioptric units for use in reflecting signs, particularly for highway purposes. It is desirable that such a unit shall correct at least partially for spherical aberration, that there shall be a controlled amount of aberration to obliterate color and that the divergency of the reflected beam shall be controlled so that the resulting beam will be of maximum intensity, of symmetrical illumination and free from pattern in cross section and of sufficient divergence to give maximum utility under highway conditions.

It is also desirable that the surfaces of the lens may have a high polish, that is, be truly optical surfaces, and that the lenses be easy to manufacture and that they be free from ridges or corrugations such as are common in Fresnel or semaphore lenses, as these tend to collect dust and thus reduce materially the brightness of the sign.

I have attained these objects by forming the front surface of a lens of spherical surfaces only, there being a central spherical zone and a series of distinct and plainly discernible spherical annular surfaces successively around this zone, these being coaxial but not concentric. The successive centers of curvature lie on the axis of the unit and the radii will be successively greater. Each of the zones is uncorrected for spherical aberration but the average focal point of all of the zones are coincident. Where the zones meet, there are slight but plainly visible cusps. The radii of the successive zones are determined as follows: In the case of the central zone, a radius is found that will bring the narrow axial beam to a focus at some point slightly beyond F, Fig. 1, say 0.5m/m in the case of the illustrative example given below, then rays parallel to the axis are triangulated through the button at increasing distances from the axis, until a point is reached where the ray falls short of the point F, by say 0.5m/m. At this point a new radius is found for the second zone, which will throw the ray to a point 0.5m/m beyond F. Then additional parallel rays are triangulated at points continually further from the axis in this second zone until a point is reached where the ray falls short of F by 0.5m/m. Then a third radius is chosen in a similar way and the process continued to the periphery of the button. Thus F, would be an average focal point for all the zones.

The distance from F, at which the rays strike the axis is defined as spherical aberration. The amount of this aberration can best be determined by trial and error and the practical performance in the use of the button. The effect of the aberration is to spread the returning cone of light to a greater angular distance and thus make the button visible at points further from the axis. This effect is in a similar way active for oblique rays as well as axial rays.

In oblique rays an astigmatic pattern is produced at the reflecting surface or focus of the button and accentuated on the return of the ray emerging again through the lens of the button. This adds somewhat to the spread of these rays. In the case of a series of spherical zones, as proposed for the front boundary of this lens, or one of the boundaries, there is formed a series of astigmatic patterns differing in size and character in such a way as to obliterate any irregularities in these images due to this astigmatism and thus the button as seen obliquely will exhibit no selective brightness as the observer moves from the plane of the axial and oblique beams to points above or below this plane, or points immediately to the inside or outside of the oblique beam.

The aberrations as above indicated are determined for the average wavelength of light in the visual spectrum, or yellow light. From the edge of a given zone, whence yellow light falls short of F, red light will fall nearer and thus return more accurately than yellow, because the refracting power of glass is less for red. At the edge of the adjoining zone, where yellow light falls beyond F, blue light will fall nearer F, because the refractive power of glass is greater for blue light, thus bending it more. Thus at the dividing line of the two zones where the curvature changes, showing as a cusp in cross section, the blue and red will occur in immediate proximity to one another and will be mixed and seen as substantially white light by an observer at a distance from the button. Thus, prismatic colors, or rainbow effects will be reduced in a sign composed of these buttons. It will thus be seen that the boundaries between zones constitute shallow grooves with angular bottoms and will have the effect of diffusing the light to a certain extent and attaining the results pointed out in the copending application of myself and Luce, Serial No. 635,034, filed November 29, 1932.

Reference will be made to the accompanying drawings in the several figures of which the same reference characters indicate the same parts and in which Fig. 1 is a diagram showing the unit on a large scale including a preferred form of the lens in elevation and a reflector in section;

Fig. 2 is an elevation of a rod forming the central part of a hob;

Fig. 3 is a section of a tube forming an annular part of the hob;

The preferred form of lens consists of a single piece of glass A having a plane rear surface P and, as shown, having a frustro conical side S. The front of the lens consists of a series of surfaces or zones, the central one designated Z being spherical, its center of curvature being at O lying upon the axis of the unit. Immediately around this is a second zone Z', the surface of which is also spherical and the center of curvature being at O'. Successive zones $Z^2$, $Z^3$ and $Z^4$ have their centers of curvature $O^2$, $O^3$ and $O^4$ respectively, upon the axis of the unit.

The curvature of the several zones are so computed that the average focus for the central part of each zone lies at the point F which is accordingly the focus of the lens. Since the zones are of finite extent, there is produced a certain amount of spherical aberration by each zone.

The dimensions hereafter given are in millimeters.

In the form illustrated in Fig. 1, any ordinary crown glass having a refractive index for the D line of 1.51 may be used. The total thickness of the lens is 10.59 and the widths of the successive zones at their bases are respectively 7.50, 10.52, 12.60, 14.30 and 15.72, the base of the button having a width of 16.49.

The successive radii of curvature for the zones Z to $Z^4$ respectively are 7.46, 7.94, 8.34, 8.75 and 9.10. Behind this unit at a point determined by the desired optical qualities of the unit, but preferably passing through the principal focal point F, is a spherical reflector r. The point F is situated 6.1 behind the surface P.

Figure 4:
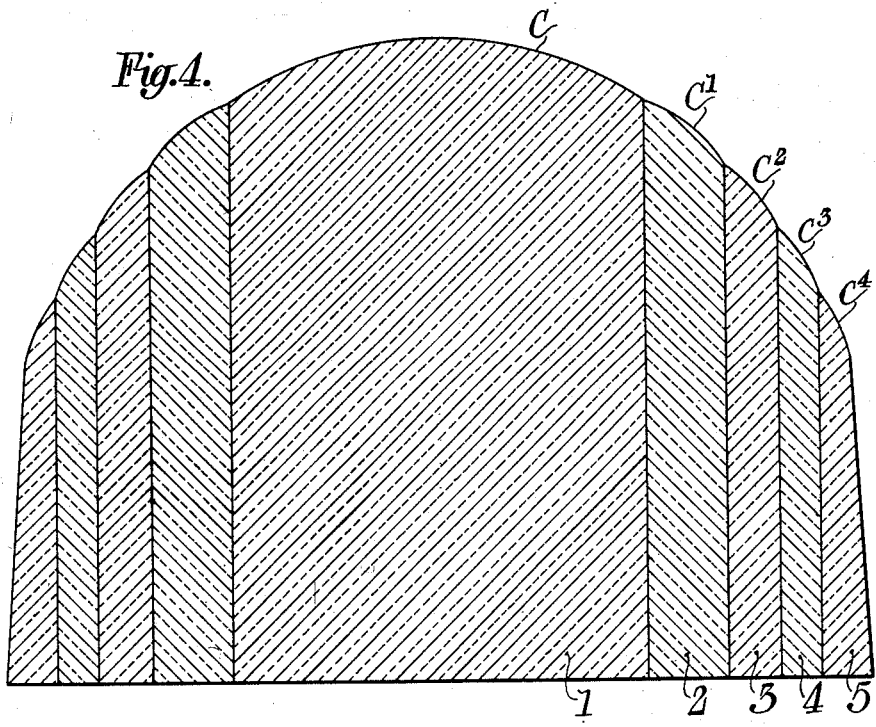
Fig. 4 is a section of a complete hob.
Figure 5:
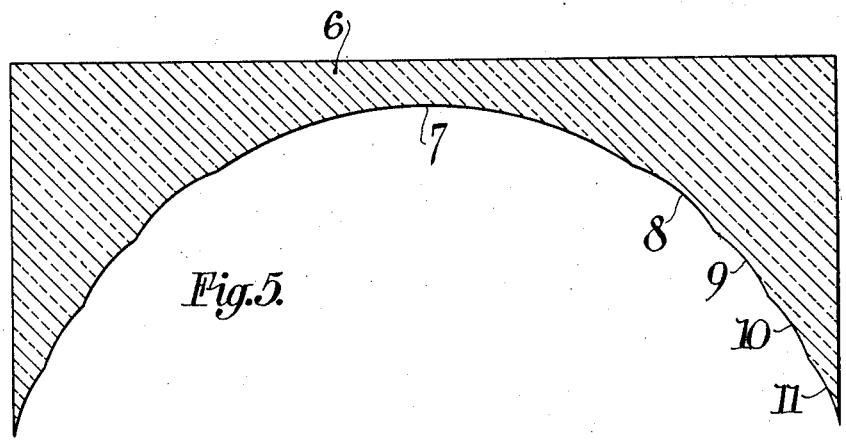
Fig. 5 is a section of a mold from which the lenses may be formed.

From a practical standpoint, a great advantage of this lens is that the surfaces can be polished by ordinary pitch polishing methods, that is, those standard in producing true optical surfaces in scientifically accurate instruments, which is not possible with an aspherical surface. This method involves the polishing of the surface with a rigid spherical tool which is moved in all directions over the surface. An aspherical surface can be polished only with a flexible tool which does not give optical accuracy or with a rigid tool moving in one direction only at any point. While the individual buttons would be made by molds, the molds would be made with highly polished surfaces. If the original or master pattern is a hob, as indicated in Fig. 4, it will be made in the following way.

A central rod 1 of steel or other suitable metal has a convex end C and this is polished by regular optical polishing methods on a pitch polisher to the desired radius of curvature for the central zone, the diameter of the rod being the diameter of the desired zone. A tube 2, a cross section of which is shown in Fig. 3, is then selected having an internal diameter equal to rod 1 and having an external diameter equal to the external diameter of the second zone. One end of this tube is then subjected to a grinding and polishing operation so as to form upon it a spherical zone at C' corresponding to the desired curvature Z' of the finished lens. This is also done by a regular pitch polishing method and the surface is given a true optical polish. The same operation is then repeated for the number of zones desired and the several tubes are then assembled to form a hob as indicated in Fig. 4, where there is shown the central rod 1 and a series of tubes 2, 3, 4 and 5 having the spherical surfaces C', $C^2$, $C^3$, and $C^4$, each of which is finished by regular optical methods and having the degree of polish obtained by such methods. If the master member is a mold rather than a hob, as shown in Fig. 6, the successive surfaces would first be approximated. The mold as a whole is indicated at 6. The central concave surface indicated by heavy line at 7 would be subjected to a pitch polishing operation and would not affect the other zones 8, 9, 10 and 11. When this central zone is sufficiently polished, the zone 8 would be similarly polished with a tool having a curvature such that it alone would be contacted and so successively the several zones would be polished.

Spherical aberration would be reduced to a certain definite amount which would not be excessive and would depend on the width of the several zones. Of course, the larger the number of zones, the less would be the aberration due to each zone from this cause. The diffusion of light from the cusps between the zones would sufficiently overcome chromatic aberration and would also tend to spread the illumination of the beam and to obliterate a pattern due to astigmatism.

I have considered as within my invention all modifications and equivalents falling within the scope of the appended claims.

It is to be understood that the units herein described are assembled in the form of characters which, by reason of the properties of the unit, are particularly legible.

Having thus described my invention, what I claim as new and desire to be secured by Letters Patent is:

1. A lens for use in a catadioptric unit and having a convex front face divided into a series of visibly distinct, coaxial zones, each zone being a portion of a spherical surface and the several zones having their centers of curvature at different points upon the optical axis of the lens, the lens faces being free from deep corrugations and the foci of the several zones being coincident, the successive zones being contiguous and constituting at their junctions shallow grooves with angular bottoms whereby a controlled amount of diffusion is introduced into the system.

2. A lens for use in a catadioptric unit and having one plane face and the other face convex and divided into a series of visibly distinct, coaxial zones, each zone being a portion of a spherical surface, the radii of curvature of successive zones outwardly from the axis being successively greater and the centers of curvature of the several zones lying on the axis, the lens being free from deep corrugations, the foci of the several zones being coincident, the successive zones being contiguous and constituting at their junctions shallow grooves with angular bottoms whereby a controlled amount of diffusion is introduced into the system.

3. A catadioptric unit comprising a simple positive lens and a reflector behind the lens, the front face of the lens being formed in a series of coaxial zones, each zone being a portion of a spherical surface and the centers of curvature of the several zones being at different points upon the optical axis of the unit, the successive zones being contiguous and constituting at their junctions shallow grooves with angular bottoms whereby a controlled amount of diffusion is introduced into the system.

4. A catadioptric unit comprising a simple lens and a reflector behind the lens, the front face of the lens being convex and formed in a series of coaxial, visibly distinct zones, each zone being a portion of a spherical surface, the radii of curvature of the successive zones outwardly from the axis being successively greater and the centers of curvature of all of the zones lying on the axis of the unit, the successive zones being contiguous and constituting at their junctions shallow grooves with angular bottoms whereby a controlled amount of diffusion is introduced into the system.

5. A catadioptric unit comprising a simple lens and a reflector behind the lens, the rear face of the lens being plane and the front face being convex and formed in a series of coaxial, visibly distinct zones, each zone being a portion of a spherical surface, the centers of curvature of the several zones lying at different points of the axis of the unit, and the foci of the several zones being coincident, the boundaries between the zones introducing a controlled amount of diffusion into the system.

CHARLES W. FREDERICK.